April 26, 1966     L. MONTESANO     3,248,472
SHEATHED CABLE WITH A FLUID STOP OF A POLYURETHANE POLYMER
Filed April 8, 1963
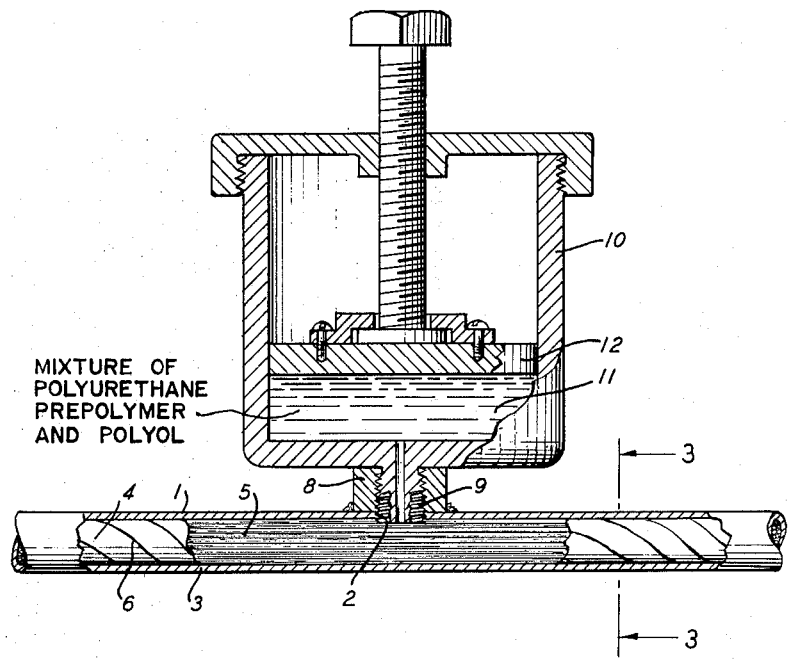
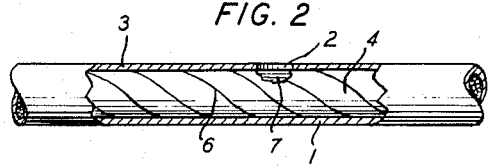
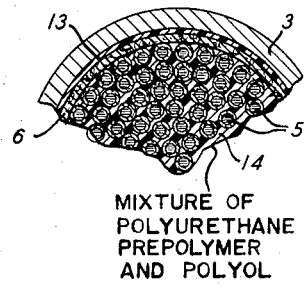
INVENTOR
L. MONTESANO ably in the field. Additionally, the prior art tech-
United States Patent Office 3,248,472
Patented Apr. 26, 1966

3,248,472
SHEATHED CABLE WITH A FLUID STOP OF A POLYURETHANE POLYMER
Lewis Montesano, Upper Montclair, N.J., assignor to Bell Telephone Laboratories, Incorporated, New York, N.Y., a corporation of New York
Filed Apr. 8, 1963, Ser. No. 271,373
9 Claims. (Cl. 174—23)

This invention relates to sealed electrical apparatus. More particularly, the present invention relates to metal and plastic sheathed electrical cables having gas-tight plugs formed therein.

In telephone cable systems using sheathed cable it is common to maintain an internal gas pressure, typically of the order of 10 pounds per square inch, within the sheath for the exclusion of moisture and for leak-locating purposes. The maintenance of such gas pressure requires a gas-tight seal at all cable terminals and at the ends of pressurized zones.

The present invention provides such a gas-tight seal which can be installed simply and quickly within the sheath without the necessity for extensive opening of the sheath or preparation of the cable core. The seal is formed by making an opening in the sheath and injecting or pouring a fluid resin compound which is capable of saturating the cable core. The compound then sets up within a reasonable time to a resilient solid state in which it forms a gas-tight plug capable of meeting service requirements.

It is necessary that the resulting plug endure under the continuous normal gas pressure at ordinary atmospheric temperatures and that it withstand, for short periods of time, gas pressures which are three to four times as high as the normal pressure. It is also necessary that the material of which the plug is formed have no corrosive or deteriorative effect on the sheath or the wires, that it have no injurious effect upon the pulp, strip paper or other insulation present, and that it have no serious detrimental effect upon the dielectric strength or insulation resistance of the cable.

Heretofore, it has been common to form plugs meeting the above requirements by injecting into the cables a mixture of a liquid polysulfide resin and a liquid epoxy resin or epoxy resin-forming material together with a small amount of curing agent. Unfortunately, the polysulfides evidence a characteristic obnoxious odor and are relatively toxic in nature, so creating handling problems for workers in the field. Additionally, the prior art techniques have not been completely satisfactory from an economic standpoint since different compositions are required for plugging sheathed cables containing plastic or paper insulated conductors. Accordingly, it has been considered desirable to obtain one composition which is capable of plugging both types of cable.

In accordance with the present invention, plugs, which are odor free and nontoxic meeting the above requirements are formed in cables, in the manner indicated, by injecting into the cable a mixture of a polyester or polyether base polyurethane prepolymer, a polyol and a small amount of a curing catalyst. The manner in which the seals are formed is shown in the accompanying drawing wherein:

FIG. 1 is a front elevational view, partly in section, of a length of cable together with apparatus for injecting the liquid resin;

FIG. 2 is a front elevational view, partly in section, of a length of cable having an opening formed in its sheath as the first step in preparation for attachment of the resin-injecting device; and FIG. 3 is a view of a portion of a section of FIG. 1 taken along the line 3—3.

As shown in the drawing, the first step in the formation of a gas-tight plug in a sheathed cable 1 is the formation of a small opening (FIG. 2) in the sheath 3 of the cable. In the cable shown in the drawing, the cable core 4 is made up of a plurality of wires 5 each covered with insulation, typically paper or plastic. The bundle of wires 5 may be enclosed in a helical paper wrapping 6.

In order to permit the plugging material to penetrate within the wrapping 6 and completely permeate the spaces between the wires, a portion of the wrapping 6 just under the opening is is torn away to leave an opening 7. An internally threaded nipple 8 is then fastened over the opening 2 by soldering, as shown in FIG. 1 or by clamping. An externally threaded short nozzle 9 of an injection device 10 is then screwed into the nipple 8. The injection device 10 contains a charge 11 of the plug-forming material and is equipped with a piston 12 for forcing the charge 11 out through the nozzle 9.

The relatively fluid plug-forming material which makes up the charge 11 is forced into the interior of the cable and completely fills all of the free spaces across the cross-section of the cable including the space 13 between the wrapper 6 and the sheath 3 and the spaces 14 between the wires and the wrapper 6. Plugging material penetrates along the length of the cable for a distance which may be of the order of from six to twelve times the internal diameter of the cable.

A plugging material is used which, although initially relatively fluid, sets without external heating within a short time after its injection into the cable to form a nonfluid solid. The setting takes place sufficiently rapidly so that the plug is formed before the plugging material has time to flow under the influence of gravity or capillarity along the length of the cable to such an excessive degree that the entire cross-section of the cable is no longer filled.

In the plugging of substantially horizontal cables, the sheaths of which have an internal diameter not exceeding about one inch, the formation of plugs in this manner is accomplished without difficult. With similar cables which are mounted in a vertical position, the tendency is much greater for the plugging material to flow within the cable before setting, and it is usually desirable to constrict the cable at at least the lower end of the volume to be occupied by the injected plugging material. This constriction is accomplished by forming a circular indentation around the circumference of the cable at the constriction point, as by hammering or by the use of known constricting tools. The constrictions retard the flow of plugging material away from the region in which it is desired to form the plug.

When it is desired to form plugs in cables having larger inside diameter, up to about three inches, it is usually desirable, even when the cables are horizontally disposed, to employ cable sheath constrictions at both ends of the volume to be occupied by the injected plugging material in order to prevent excessive flow of the plugging material prior to setting.

After the plugging material has been injected into the cable, the nozzle 9 of the injection device is removed from the nipple 8 and the hole in the nipple is closed by screwing into it an externally threaded plug (not shown).

Cables sheathed with metals other than lead or sheathed with plastics, such as polyethylene or sheathed with layers of both metal and plastic sheathing materials, are also often maintained under internal pressure and can have gas-tight plugs formed within them by the procedure described above.

In the practice of the invention it is necessary that the viscosity of the plugging material at 25° C. at the time of injection be within the range of 100–10,000 centipoises. It has been determined that the use of materials having viscosities less than the indicated minimum results in flow of the plugging material prior to setting whereas the use of compositions having viscosities beyond the noted maximum fail to result in saturation of the paper or plastic insulation.

As noted above, the plugging material is formed of a mixture of a polyester or polyether base polyurethane prepolymer, a polyol and a curing catalyst.

The polyether and polyester base polyurethane prepolymers are well known to the art, and may be prepared as described in "High Polymers—Chemistry and Technology," volume XVI, Part 1, Saunders and Frisch, 1961, Interscience Publishers, New York.

Typically, these prepolymers are prepared by reacting a linear long chain polyol having a molecular weight within the range of 200 to 12,000 and containing at least two hydroxyl groups in each molecule with an excess of a selected polyisocyanate. Such polyols may be polyesters, polyesteramides, polyethers and vegetable oils having hydroxyl groups. The polyesters and polyethers are preferred for the purposes of the present invention.

Suitable polyesters in this use may be obtained by reacting high molecular weight dicarboxylic acids such as adipic acid, phthalic anhydride or dimerized linoleic acid with simple glycols such as ethylene, propylene, 1,3-butylene, 1,4-butylene and diethylene glycol or triols such as glycerin, 1,2,6-hexanetriol, trimethylolpropane, trimethylolethane and derivatives of the triglyceride of ricinoleic acid (castor oil).

Polyester polyols, which are found to be particularly suited for the preparation of liquid isocyanate-terminated prepolymers suitable in the practice of the present invention, are castor oil polyols, the properties of which are set forth below in Table I.

TABLE I

*Castor polyols suitable for preparing urethane elastomers*

| Polyol | Isocyanate equiv. wt. | Approx. functionality | Hydroxyl number | Acid value | Est. mol. wt. | Volatile matter percent | Density 25° C. g./cm.³ | Viscosity 25° C. (cps.) |
|---|---|---|---|---|---|---|---|---|
| I | 150 | 4.2 | 370 | 3 | 630 | 0.2 | 0.992 | 3,600 |
| II | 163 | 2.9 | 340 | 5 | 475 | 0.2 | 0.983 | 900 |
| III | 230 | 2.4 | 240 | 4 | 555 | 0.5 | 0.960 | 475 |
| IV | 252 | 2.3 | 220 | 3 | 580 | 0.5 | 0.966 | 550 |
| V | 186 | 2.3 | 295 | 6 | 430 | 0.4 | 0.962 | 290 |
| VI | 204 | 2.2 | 270 | 5 | 450 | 0.5 | 0.969 | 380 |
| VII | 540 | 1.7 | 100 | 4 | 420 | 0.2 | 0.948 | 390 |
| VIII | 342 | 0.9 | 160 | 0.5 | 305 | 0.4 | 0.924 | 32 |
| Castor oil | 342 | 2.7 | 163 | 1 | 925 | 0.02 | 0.957 | 680 |

The polyethers found suitable for this purpose include the polyether glycols which are prepared by the polymerization of compounds such as ethylene oxide, propylene oxide, butylene oxides, tetrahydrofuran, styrene oxide, et cetera. Typical examples are polyoxyethylene glycols, polyoxypropylene glycols, polyoxyethylene block copolymers, polyalkylene arylene glycol, polyalkylene ether thioether glycol, polyoxypropylene triols, basic polyethers, such as the tetra functional ethylene oxide-propylene oxide block copolymers in which various amines are employed as polymerization initiators.

The polyisocyanates of interest include aromatic, aliphatic, alicyclic and heterocyclic polyisocyanates and mixtures thereof. Typical of the products used for this purpose are 2,4-tolylene diisocyanate, 2,6-tolylene diisocyanate, 4-chloro-1,3-phenylene diisocyanate, 4,4'-bibiphenylene diisocyanate, 1,5-naphthalene diisocyanate, 1,4-tetramethylene diisocyanate, 1,4-cyclohexylene diisocyanate, 3,1'-dimethyl-4,4'-biphenylene diisocyanate, 3,3-dimethyloxy - 4,4' - biphenylene diisocyanate, triphenylmethane triisocyanate, 4,4'-diphenylmethane diisocyanate, 1,6-hexamethylene diisocyanate and mixtures thereof.

The reaction product obtained by reacting such polyols with polyisocyanates is a moderate molecular weight liquid or low melting solid which terminates in isocyanate groups and is termed a "prepolymer." Typical polyester base polyurethane prepolymers which are especially well adapted for the practice of the present invention are prepared by reacting selected castor polyols of the type described in Table I with from 2.4 to 2.6 equivalents of tolylene diisocyanates (TDI). The composition and properties of typical prepolymers are described in Table II.

TABLE II

*Composition and properties of castor polyol prepolymers*

| Composition (parts by wt.) | A | B | C |
|---|---|---|---|
| Castor oil | 62 | | |
| Castor oil polyol III | | 50.5 | |
| Castor oil polyol IV | | | 52.5 |
| TDI | 38 | 49.5 | 47.5 |
| —NCO/—OH Equivalent ratio | 2.4 | 2.6 | 2.6 |
| Properties: | | | |
| Color | Light amber | Light amber | Light amber |
| Viscosity (p/25° C.) | 275 | 400 | 390 |
| —NCO Content, percent | 10 | 13.6 | 13.7 |
| Equiv. wt. per —NCO group | 420 | 308 | 306 |
| Density 25° C. (lb./gal.) | 8.90 | 9.15 | 9.20 |

A typical polyether base polyurethane prepolymer suitable for the practice of the present invention may be prepared by reacting polytetramethylene ether glycol with tolylene diisocyanate. The resultant prepolymer manifests the following physical properties:

TABLE III

Composition _____ Isocyanate terminated polymer.
Isocyanate content _____ 4.0–4.3%.
Molecular weight (app.) _____ 2000.
Viscosity, Brookfield, 84° F. _____ 16,000–19,000 cps.
Specific gravity at 75° F. _____ 1.06.

The isocyanate terminated prepolymers so obtained are next reacted with a polyol of the type described above. Generally, the two substances react slowly at room temperature and eventually set to a gel. This rate of reaction, however, is not satisfactory for the purposes of the present invention and may conveniently be accelerated to the point at which gelling occurs at room temperature within a reasonable time by the use of a curing catalyst.

Catalysts suitable in this use include tertiary amines, salts of organic acids, and organometallic compounds. Typical catalyst are triethylamine, tripropylamine, triethylenediamine, N-methyl morpholine, N-ethyl piperidine, pyridine, quinoline, N-phenol-3,5-diethyl-2-propyl-1,4-dihydropyridine, cobalt naphthenate, methyldiethanolamine, N,N,N',N' - tetramethyl - 1,3 - butanediamine [N,N,N',N'-tetrakis-(2-hydroxypropyl)ethylene diamine] dibutyl tin dilaurate, et cetera.

The prepolymer and the polyol are so proportioned in forming the plugging material that the ratio of prepolymer to polyol, by weight, lies in the range of 4:1 to 1:1.5. The amount of curing catalyst will ordinarily be between about 0.005 percent and about 2.0 percent, by weight, of the total mixture.

It may also be desirable during the preparation of the described polyurethane elastomers to control the viscosity within the noted limits. This may be conveniently accomplished by the use of a diluent. Suitable materials in this use are the aromatic hydrocarbons, chlorinated aromatic hydrocarbons, et cetera. The amount of diluent will ordinarily range between 10 and 50 percent, by weight, of the total mixture.

Several examples of the application of the present invention are set forth below. They are intended merely as illustration and it is to be appreciated that the methods described may be varied by one skilled in the art without departing from the spirit and scope of the present invention.

EXAMPLE I

A polyurethane plugging compound was formed by mixing 74 parts, by weight, of the polyester base polyurethane prepolymer designated B in Table II, with 27 parts, by weight, of the polyol designated I in Table I, and 0.022 part, by weight, of triethylenediamine. The resulting mixture was injected in the manner described above into a lead sheated cable containing 11 pairs of 26 gauge copper conductors insulated with paper. The cable was then inserted in a temperature cycling box and subjected to cycling from −40 to +140° F. in 8 hour cycles. The plugging compound held gas pressure for greater than 114 cycles.

EXAMPLE II

The procedure of Example I was repeated employing 69 parts, by weight, of prepolymer, 32 parts, by weight, of polyol V, described in Table I, and 0.25 part, by weight, of triethylenediamine. The resultant mixture was injected into a low density polyethylene sheathed cable containing 300 pairs of 19 gauge copper conductors insulated with low density polyethylene. The plugging compound served as a gas pressure barrier for greater than 159 cycles.

EXAMPLE III

The procedure of Example II was repeated with the exception that 1 part, by weight, of triethylenediamine, and 20 parts, by weight, of xylene based on the total weight of the mixture were employed. The resulting mixture was injected into a lead sheathed cable containing 11 paris of 26 gauge copper conductors insulated with paper. The plugging compound served as a gas pressure barrier for greater than 114 cycles.

EXAMPLE IV

The procedure of Example I was repeated employing 60 parts, by weight, of prepolymer, 40 parts, by weight, of polyol, 0.063 part, by weight, of catalyst and 25 parts, by weight, of chloroinated biphenyl. The resulting mixture was injected into a lead sheathed cable containing 300 pairs of 26 gauge copper conductors insulated with paper. The cable was cycled for 96 cycles, then heat aged at 140° F. for 33 days, and recycled for greater than 404 cycles. The plugging compound served as a gas pressure barrier for greater than 500 cycles.

EXAMPLE V

A polyurethane plugging compound was formed by mixing 74 parts, by weight, of the polyether base polyurethane prepolymer described in Table III with 27 parts, by weight, of the polyol designated I in Table I, 0.25 part, by weight, of triethylenediamine and 28 parts, by weight, of xylene. The resulting mixture was injected into a lead sheathed cable containing 11 pairs of 26 gauge copper conductors insulated with paper. The mixture cured within 30 minutes, and held 10 p.s.i. pressure at room temperature in 100 hours. The plugging compound held gas pressure for greater than 102 cycles at temperatures from −40 to +140° F.

EXAMPLE VI

The procedure of Example V was repeated with the exception that 24 parts, by weight, of diglycerol and 0.125 part, by weight, of catalyst were employed. The resulting mixture was injected into a low density polyethylene sheathed cable containing 50 pairs of 19 gauge copper conductors insulated with low density polyethylene. The plugging compound served as a gas pressure barrier for greater than 114 cycles.

While the invention has been described in detail in the foregoing specification and the drawings similarly illustrate the same, the aforesaid is by way of illustration only, and it is not restricting in character. The several modifications which will readily suggest themselves to persons skilled in the art are all considered within the scope of the invention, reference being had to the appended claims.

What is claimed is:

1. A sheathed electrical cable comprising a plurality of electrical conductors enclosed in a sheath, said cable having a gas-tight plug enclosed within the sheath and adhering to the inner surface of the sheath and to the surface of said conductors, said plug being formed by the curing in situ of a mixture of a polyurethane prepolymer selected from the group consisting of polyester and polyether base polyurethane prepolymers, and a polyol.

2. A sheathed electrical cable containing a gas-tight plug and adapted to be maintained under internal gas pressure on one side of the plug, said cable being formed of a sheath filled with a plurality of electrical conductors each insulated with a layer of porous insulation, the free space within a short length of said cable being filled with a nonfluid resin which impregnates said layers of porous insulation and adheres to the inner surfaces of said sheath so as to form said gas tight plug, said resin being the product of the reaction of a polyurethane prepolymer selected from the group consisting of polyester and polyether base polyurethane prepolymers, a polyol, and a catalyst.

3. A cable in accordance with claim 2 wherein said resin includes a diluent.

4. A cable in accordance with claim 2 wherein said prepolymer is a polyether base polyurethane prepolymer.

5. A cable in accordance with claim 2 wherein said prepolymer is a polyester base polyurethane prepolymer.

6. A cable in accordance with claim 2 wherein said polyol has a molecular weight within the range of 200 to 12,000 and contains at least two hydroxyl groups in each molecule.

7. A cable in accordance with claim 2 wherein the ratio of prepolymer to polyol is within the range of 4:1 to 1:1.5 and the amount of catalyst is within the range of 0.005 to 2.0 percent, by weight, of the total mixture.

8. A cable in accordance with claim 7 wherein said resin is the reaction product of 74 parts, by weight, of the polyester base polyurethane prepolymer designated B in Table II with 27 parts, by weight, of the polyol designated I in Table I in the presence of 0.022 part, by weight, of triethylenediamine.

9. A cable in accordance with claim 7 wherein said resin is the reaction product of 74 parts, by weight, of the polyether base polyurethane prepolymer formed by the reaction of polytetramethylene ether glycol with tetrene diisocyanate, with 27 parts, by weight, of the polyol designated in Table I in the presence of 28 parts, by weight, of xylene and 0.25 part, by weight of triethylenediamine.

References Cited by the Examiner

UNITED STATES PATENTS

| | | | |
|---|---|---|---|
| 2,621,166 | 12/1952 | Schmidt | 260—75 |
| 2,729,618 | 1/1956 | Muller. | |
| 2,792,441 | 5/1957 | Platow | 174—23 |
| 2,929,800 | 3/1960 | Hill. | |

ROBERT K. SCHAEFER, *Primary Examiner.*

JOHN P. WILDMAN, JOHN F. BURNS, DARRELL L. CLAY, *Assistant Examiners.*